(12) United States Patent
Pekarek-Kostka et al.

(10) Patent No.: US 11,964,398 B2
(45) Date of Patent: Apr. 23, 2024

(54) SYSTEMS AND METHODS FOR AUTONOMOUS ROBOT DISTRIBUTED PROCESSING

(71) Applicant: MicroPharmacy Corporation, Wethersfield, CT (US)

(72) Inventors: Peter Pekarek-Kostka, Middletown, CT (US); John E. Kulesza, Wethersfield, CT (US)

(73) Assignee: Micropharmacy Corporation, Wethersfield, CT (US)

( * ) Notice: Subject to any disclaimer, the term of this patent is extended or adjusted under 35 U.S.C. 154(b) by 328 days.

(21) Appl. No.: 17/160,518

(22) Filed: Jan. 28, 2021

(65) Prior Publication Data

US 2022/0234207 A1 Jul. 28, 2022

(51) Int. Cl.
  *B25J 9/16* (2006.01)
  *B25J 13/00* (2006.01)
  *B25J 13/08* (2006.01)

(52) U.S. Cl.
  CPC .......... *B25J 9/1697* (2013.01); *B25J 9/1676* (2013.01); *B25J 9/1679* (2013.01); *B25J 13/006* (2013.01); *B25J 13/086* (2013.01); *B25J 13/089* (2013.01)

(58) Field of Classification Search
  CPC ...... B25J 9/1697; B25J 9/1676; B25J 9/1679; B25J 13/006; B25J 13/086; B25J 13/089; B25J 11/0005
  See application file for complete search history.

(56) References Cited

U.S. PATENT DOCUMENTS

| 8,386,078 | B1 | 2/2013 | Hickman et al. |
| 9,778,661 | B2 * | 10/2017 | Wang ..................... G05D 1/101 |
| 10,386,850 | B2 * | 8/2019 | Heinla ................. G05D 1/0212 |
| 2007/0192910 | A1 * | 8/2007 | Vu ....................... G05D 1/0246 |
| | | | 901/1 |

(Continued)

FOREIGN PATENT DOCUMENTS

| CN | 106168805 A | 11/2016 |
| CN | 103926838 B | 2/2017 |

(Continued)

OTHER PUBLICATIONS

S. Jordan et al., "The rising prospects of cloud robotic applications", IEEE 9th International Conference on Computational Cybernetics, Jul. 8-10, 2013 (https://core.ac.uk/download/pdf/206440301.pdf, accessed Jul. 8, 2013).

(Continued)

*Primary Examiner* — Jaime Figueroa
*Assistant Examiner* — Madison B Emmett
(74) *Attorney, Agent, or Firm* — Dinsmore & Shohl LLP

(57) ABSTRACT

Systems and methods for autonomous robot distributed processing are provided. A method includes receiving, at a robot, camera output from a camera located on the robot. The method may further include outputting the camera output to a mobile client device. The method may also further include receiving at the robot, from the mobile client device, object recognition metadata based upon the camera output. The method may additionally include outputting a notification from the robot to a user of the mobile client device based upon the object recognition metadata.

17 Claims, 8 Drawing Sheets

(56) References Cited

U.S. PATENT DOCUMENTS

| | | | |
|---|---|---|---|
| 2009/0173561 A1* | 7/2009 | Moriguchi | B25J 5/007 |
| | | | 901/1 |
| 2016/0121482 A1* | 5/2016 | Bostick | B25J 9/16 |
| | | | 901/1 |
| 2016/0274580 A1* | 9/2016 | Jung | G05D 1/0016 |
| 2016/0314621 A1* | 10/2016 | Hill | B25J 13/006 |
| 2018/0241938 A1* | 8/2018 | Buibas | H04N 13/243 |
| 2019/0207866 A1 | 7/2019 | Pathak et al. | |
| 2019/0358814 A1* | 11/2019 | Park | B25J 13/081 |
| 2020/0005787 A1* | 1/2020 | Shin | G06F 3/167 |
| 2020/0016754 A1 | 1/2020 | Skubch | |
| 2020/0061838 A1* | 2/2020 | Amacker | G06F 3/0346 |
| 2020/0094397 A1* | 3/2020 | Young | G08B 21/0476 |
| 2020/0130197 A1* | 4/2020 | Roh | B25J 19/026 |
| 2021/0174370 A1* | 6/2021 | Yim | G06Q 10/06316 |
| 2021/0334599 A1* | 10/2021 | Pirk | G06K 9/627 |
| 2023/0197073 A1* | 6/2023 | Jang | B25J 11/0005 |
| | | | 704/275 |

FOREIGN PATENT DOCUMENTS

| | | |
|---|---|---|
| CN | 105204456 B | 10/2018 |
| CN | 107066507 B | 9/2019 |
| CN | 110489182 A | 11/2019 |
| CN | 111192364 A | 5/2020 |
| IN | 107515002 A | 12/2017 |
| JP | 6526613 B2 | 6/2019 |
| KR | 102043421 B1 | 11/2019 |
| WO | 2019204945 A1 | 10/2019 |

OTHER PUBLICATIONS

Olimpiya Saha et al., "A comprehensive survey of recent trends in cloud robotics architectures and applications", Robotics, 2018, 7(3), 47 (https://www.mdpi.com/2218-6581/7/3/47/htm, accessed Aug. 30, 2018).

Ben Hu et al., "Cloudroid: a cloud framework for transparent and QOS-aware robotic computation outsourcing", IEEE, May 16, 2017 (https://arxiv.org/pdf/1705.05691.pdf, accessed Oct. 15, 2020).

* cited by examiner

SYSTEMS AND METHODS FOR AUTONOMOUS ROBOT DISTRIBUTED PROCESSING

BACKGROUND

Robotic assistants can provide a variety of beneficial tasks for which a user may need or desire assistance. By contrast, visually-impaired users have traditionally utilized trained dogs to assist them with mobility. However, there are important limitations on the assistance that a dog can provide, such as being unable to speak words to articulate specifics about the environment. While robotic assistants may now be able to perform a variety of assistive tasks for such users, the tasks can be computationally intensive. Moreover, conventional autonomous robots can be expensive and typically suffer from a shortened battery life due to performing such computationally intensive tasks. Further, while a robot can be recharged, the need for frequent recharging can make the robot unavailable for users who may need such assistance.

Accordingly, a need exists for systems that provide more efficient autonomous robotic assistance, along with methods of use of such systems.

SUMMARY

In one embodiment, a system may include a robot comprising network interface hardware and a camera communicatively coupled to the network interface hardware. The robot may also include a motorized mobility assembly and a processor communicatively coupled to the network interface hardware and the motorized mobility assembly. The robot may further include a memory coupled to the processor, wherein the processor is configured to receive camera output from the camera. The processor may be further configured to output, via the network interface hardware, the camera output to a mobile client device. The processor may be additionally configured to receive, from the mobile client device, object recognition metadata based upon the camera output. The processor may also be configured to output a notification to a user of the mobile client device based upon the object recognition metadata.

In another embodiment, a method may include receiving, at a robot, camera output from a camera located on the robot. The method may further include outputting the camera output to a mobile client device. The method may also further include receiving at the robot, from the mobile client device, object recognition metadata based upon the camera output. The method may additionally include outputting a notification from the robot to a user of the mobile client device based upon the object recognition metadata.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to systems and methods for autonomous robot distributed processing. For example, an autonomous robot may provide a variety of services to users, such as helping them navigate an environment having pedestrians and/or hazards. The visually-impaired have long used trained dogs, which can be utilized as a guide. However, dogs are unable to explain, for example, that there is a split in the path and the left path will be taken. An autonomous robot can utilize object detection and provide alerts utilizing its own computing hardware. However, tasks such as continuous scanning and object recognition can more quickly drain the robot's battery as well as be computationally intensive and require additional hardware for the robot, which in turn can make the robot more expensive, heavy, and large. By outsourcing tasks such as object recognition, the cost, weight, and/or size of the robot may be decreased, and the battery life may be increased. This in turn can result in a robot that is less expensive, smaller, lighter, and one that can last longer between charges, thus making such robots more accessible to both purchasers (decreased cost) and users (slower battery depletion).

Figure 1A:
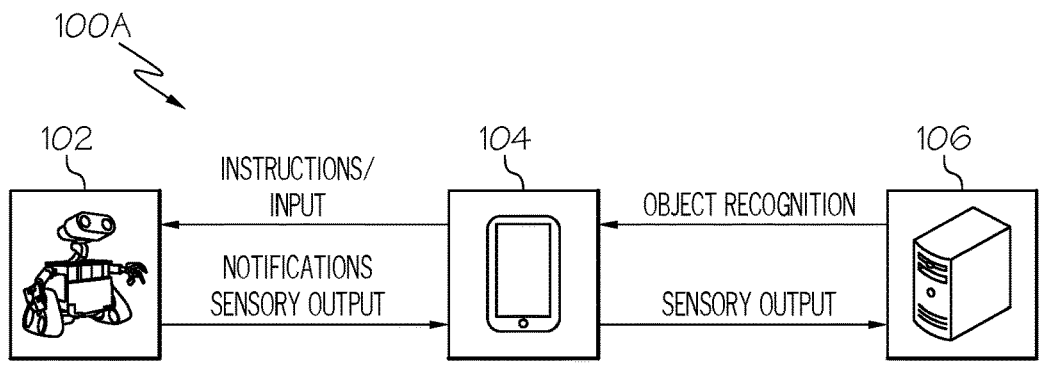
FIG. 1A schematically illustrates an exemplary operating environment featuring a robot, a client device, and a remote server, according to one or more embodiments shown and described herein.

Referring now to FIG. 1A, an exemplary operating environment 100A featuring a robot 102, a client device 104, and a server 106 is shown according to various embodiments. As discussed in more detail herein, such as with respect to FIG. 5B, any suitable type of robot 102 may be utilized, such as an autonomous robot with wheels, treads, legs, and/or the like. The robot 102 may utilize any suitable type(s) of video input devices (cameras and the like), audio input devices (microphones and the like), tactile sensors, and the like. The robot 102 may send notifications (such as proximity notifications for the robot 102 with respect to the user and/or client device 104, collision warnings, and the like) and/or sensory output (such as camera output, audio, tactile, and the like) to a client device 104 via any suitable wireless protocol (Bluetooth, RFID, NFC, and the like). The client device 104 (or the term mobile client device, which may be used hereinafter interchangeably) may be any suitable type of portable computing device that can be held and/or worn by a user, such as by way of non-limiting examples, a smartphone, laptop, tablet, wearable computing device, and the like, as discussed in more detail herein, such as with respect to FIG. 5A. The client device 104 may send the sensory output sensory data received from the robot 102 to a server 106 (or the term remote server, which may be used hereinafter interchangeably) due to the computational burdens that the analysis of such sensory output may place upon the limitations of the client device 104 (computational limitations, battery life, memory constraints, performance degradation, and the like). In this embodiment, any quantity/type of server 106 or other computer device(s), such as the computing device depicted in FIG. 5A, may be utilized in any suitable remotely-accessible configuration (cloud, server cluster, stand-alone server, etc.) via any type of network connection such as LTE, WiMAX, UMTS, CDMA, GSM, any other type of internet connection, and the like.

One or more servers 106 (which may include any suitable configuration such as a cloud and/or otherwise remote/distributed computing environment) may be utilized in this embodiment to process the sensory output forwarded from the robot 102 to the client device 104 to the server 106. In other embodiments, the robot 102 may be in direct communication with a remote computing device such as the server 106 for any suitable purpose, such as processing the sensory output from the robot 102. The server 106 may process any sensory output from the robot 102, such as images/video from the robot 102, and/or perform any suitable operations to process the sensory data, such as object recognition, person recognition, motion prediction, facial recognition (or any suitable biometric identification), and the like. Any suitable object recognition techniques may be utilized, based upon machine learning (Viola-Jones object detection framework based on Haar features, scale-invariant feature transform, Histogram of oriented gradients features, and the like) or deep learning (single shot multibox detector, you only look once, single-shot refinement neural network for object detection, deformable convolutional networks, and the like). Such sensory data processing may be computationally intensive, particularly if done in real time or substantially real time (as in this embodiment, although it may be periodic and/or delayed in other embodiments). The sensory data processing may be utilized to identify other people (such as pedestrians on the move), objects (lampposts, furniture, trees, and the like), and/or hazards (holes in the ground, cliffs, vehicles, and the like). As discussed in more detail with respect to FIG. 3, the locations of the robot 102 and/or client device 104 may be determined. This location data may also be taken into account for the sensory data processing.

For example, image processing on the server 106 may identify a pedestrian in order to predict that the pedestrian will, based upon their predicted motion, cross paths with the user holding/using the client device 104. In other embodiments, motion and/or path prediction may be determined on the client device 104 and/or the robot 102.

In this embodiment, the server 106 may send the object recognition data (and/or person/biometric recognition data) to the client device 104. The client device 104 may transmit the object recognition data to the robot 102 in some embodiments. In this embodiment, the client device 104 may receive user input/instructions from the user, which may include instructions and/or other input received and sent to the robot 102 which may include control of the robot 102 and/or making choices/confirmations of options (such as renting the robot as a guide and/or selecting a route for the robot to lead the user from among multiple possible paths). In some embodiments, the client device 104 may authenticate the user in order to be able to communicate with the robot 102 (such as to issue commands) via biometric recognition (facial recognition, eye/iris recognition, fingerprint recognition, voice recognition, and the like) and/or password (and/or two-factor) authentication. As discussed in more detail herein, any suitable type of software (program, smartphone app, and the like) may be utilized on the client device 104 to perform a variety of functions described herein, such as receive sensory output from the robot and/or notifications from the robot 102 and send these to the server 106, receive object recognition data/metadata from the server 106, send instructions/input from the user to the robot 102, perform or otherwise share computing tasks such as object recognition with the server 106, and the like.

Figure 1B:
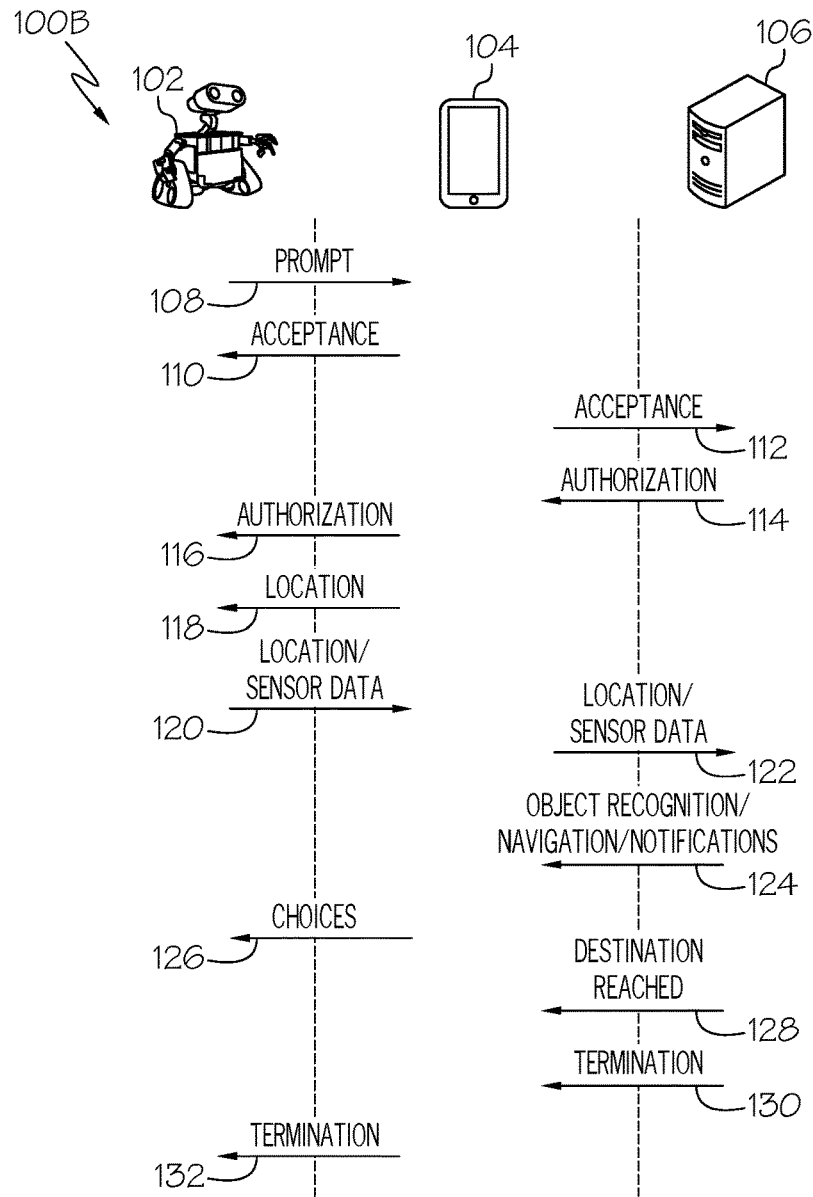
FIG. 1B schematically illustrates exemplary data flow between the robot, the client device, and the remote server of FIG. 1A, according to one or more embodiments shown and described herein.

Referring now to FIG. 1B, an exemplary data flow 100B between the robot 102, the client device 104, and the remote server 106 of FIG. 1A is shown according to various embodiments. At operation 108, the robot 102 may send a prompt to the client device 104. The prompt may be any type of communication, such as a solicitation to rent or purchase this or another robot 102. Additional prompts may include requesting a destination location, destination type, disability information, payment information, and the like. At operation 110, the client device 104 may send an acceptance to the robot 102 along with any additional information, such as destination location, destination type, disability information, payment information, and the like. At operation 112, the client device 104 may send the acceptance to the server 106, in which the acceptance data sent to the server 106 may differ from the acceptance data sent to the robot 102. In other embodiments, the robot 102 may send the acceptance data to the server 106. At operation 114, the server 106 may send authorization to proceed with renting the robot 102 to the client device 104. At operation 116, the client device 104 may send authorization to proceed to the robot 102. In other embodiments, the server 106 may directly send the authorization to proceed to the robot 102. At operation 118, the client device 104 may send location data to the robot 102. The location data may be based upon any suitable location-determining protocol such as global position systems (GPS), cell tower triangulation, Wi-Fi based location, and the like. At operation 120, the robot 102 may send location data and/or sensor data to the client device 104. In this embodiment, regarding location data, the robot 102 may provide distance information obtained by/from one or more sensors located on/in the robot, such that the location of the robot 102 can be determined relative to the client device 104 via triangulation and the like. Further to this embodiment, sensor data may include camera data, microphone audio, and the like. At operation 122, the client device 104 may send the location and/or sensor data to the server 106.

Object recognition may be performed upon the sensor data at the server 106 in this embodiment. In other embodiments, object recognition may be performed at the server 106, client device 104, robot 102, other computing device(s), and/or any combination thereof. Any suitable type of object recognition may be utilized. At operation 124, the server 106 may send object recognition data and/or metadata derived from the sensor data (such as image data), navigation data, and/or notifications to the client device 104. Notifications may include alerts about potential objects and/or hazards detected in the sensor data. As discussed in more detail with respect to FIG. 2C, a potential hazard may be detected within the environment of the robot 102 and/or user of the client device 104. At operation 126, choices/ options may be presented by the client device 104 (such as via a graphical user interface on a screen) to the user. As discussed in more detail with respect to FIG. 2C, choices such as choosing a path among multiple paths may be selected on the client device 104. The choice(s) selected by the user may be sent from the client device 104 to the robot 102. In turn, the robot 102 may act in some embodiments according to the choice(s) supplied to the robot 102, such as proceeding down the path selected by the user of the client device 104.

At operation 128, confirmation of the destination being reached may be sent from the server 106 to the client device 104. This confirmation may be derived at the server 106, for example, by comparing the location data received from the client device 104 with the destination location stored on the server 106. In other embodiments, the client device 104 and/or the robot 102 may report their location(s) to the server 106. At operation 130, a termination notification may be sent to the client device 104 from the server 106. This may be based, for example, on the robot 102 and/or the client device 104 arriving at the destination. The client device 104 may provide options for additional destinations in some embodiments. At operation 132, a corresponding termination notification may be sent from the client device 104 to the robot 102. In some embodiments, the robot may leave to go to a predetermined location or zone and/or solicit users of other mobile client devices 104 elsewhere.

Figure 2A:
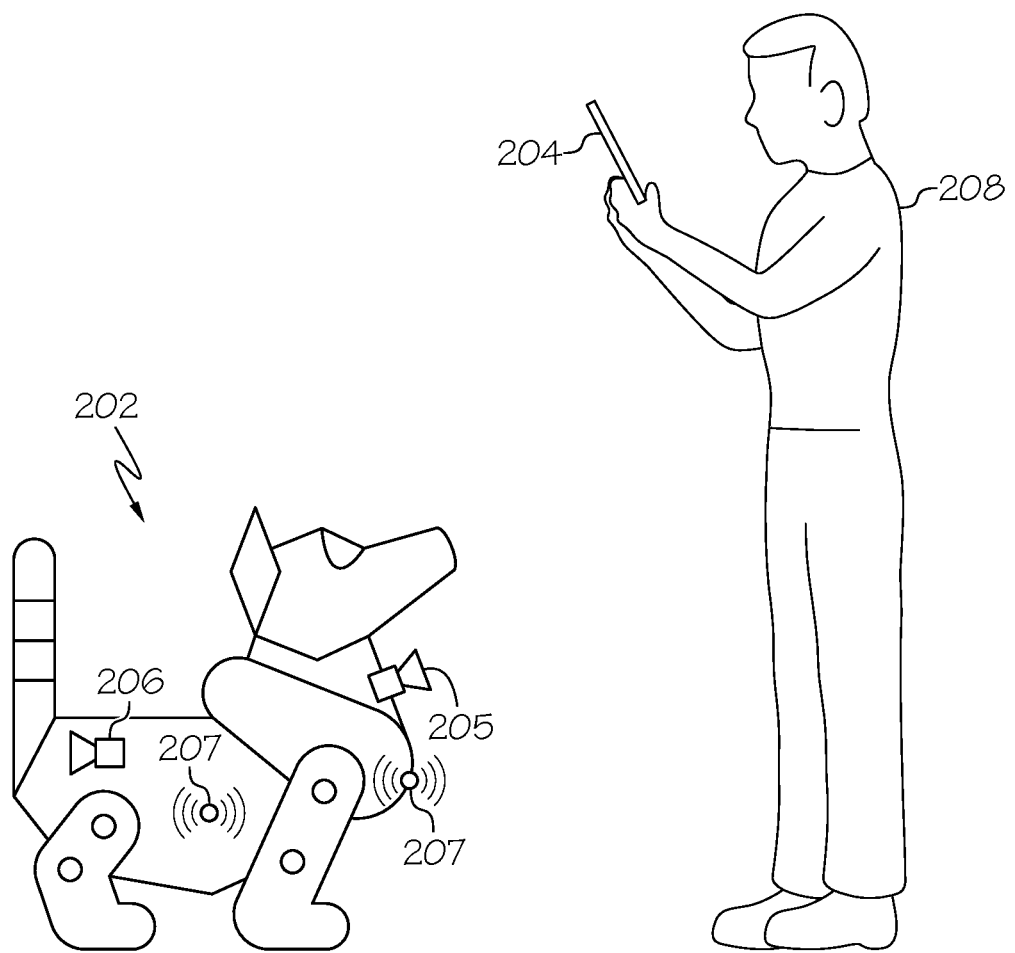
FIG. 2A schematically illustrates an exemplary operating environment depicting interaction between an autonomous robot and a user via a portable client device, according to one or more embodiments shown and described herein.

Referring now to FIG. 2A, an exemplary operating environment depicting interaction between an autonomous robot and a user via a portable client device is shown according to various embodiments. In this embodiment, a user 208 may utilize a mobile client device 204 to communicate with a robot 202. The robot 202, by way of non-limiting example, may solicit or otherwise advertise its services to act as a guide for the user 208 via the mobile client device 204, in which the user may accept (such as via providing payment via the mobile client device 204) or reject the offer. In this embodiment, the robot 202 may have legs, although any suitable mobility option(s) may be utilized (wheels, tread, wings, rotors, and the like). The robot 202 may feature any number of cameras, which may include in some embodiments a front camera 205 and/or a rear camera 206, although cameras may be located on/in any suitable portion of the robot 202 facing any appropriate direction. In this embodiment, the robot 202 may have any suitable number of sensors 207 that may be located on/in any suitable portion of the robot 202. The sensors 207 may utilize any suitable protocol (Bluetooth, RFID, NFC, and the like) to communicate with the client device 204 via a wireless signal, such that the location of the robot 102 can be determined relative to the client device 104 via triangulation and the like.

Figure 2B:
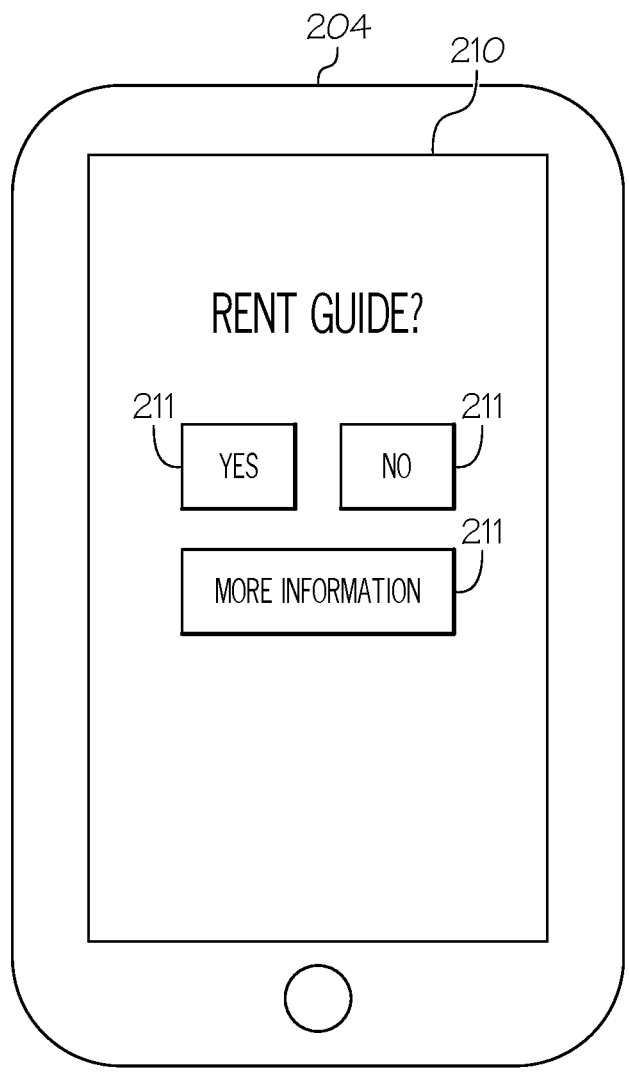
FIG. 2B schematically illustrates the exemplary operating environment of FIG. 2A wherein the user utilizes the autonomous robot via the display of the portable client device, according to one or more embodiments shown and described herein.

Referring now to FIG. 2B, the exemplary operating environment of FIG. 2A, wherein the user may decide to utilize the autonomous robot via the display of the portable client device, is shown according to various embodiments. The client device 204 may include an input/output (I/O) interface such as a display 210 providing a graphical user interface (GUI). In one embodiment, the I/O interface may utilize cameras in the display client for gaze tracking and/or gesture/movement authenticating and/or tracking a user interacting with the display client 100. In embodiments, the display 210 may be a touch screen. By way of non-limiting example, the I/O interface may be based upon the user 208 downloading software (e.g., an application, program, executable, and the like) onto their client device 204 to communicate with the robot 202 and/or server. The client device 204, by way of non-limiting example, may provide (via a downloaded software application) its location to the server, such that the server can provide directions on the client device 204 to travel to a robot 202 (such as the nearest robot) and/or direct one or more robots 202 to seek out the client device 204. The software application on the client device 204 may, in turn, utilize a threshold distance, based upon the client device 204 and a robot 202 being within a threshold distance. More specifically, this threshold distance may be either determined by the server, based upon the reported locations of a robot 202 and a client device 204 by virtue of its software, or determined by the software as based upon the distance being wirelessly reported between a robot 202 and the client device 204, utilizing any suitable protocol such as Bluetooth. In some embodiments, the server and/or a robot may send a solicitation to rent a robot to software on the client device 204, regardless of the proximity of the client device 204 to any robot.

Based upon the server and/or a robot sending a solicitation to the client device 204, the software on the client device 204 may provide selectable options 211 that include, for example, options to rent the robot as a guide, such that the user can immediately rent or decline the offer, or request further information. In this way, if a user declines, via a selectable option 211 on the client device 204 software, the robot can move along to find other users. If the user utilizes a selectable option 211 to request more information, the software on the client device 204 may provide any type of information regarding the robot and/or terms of the rental, which may be provided by the software on the client device 204, the robot, and/or the server. If the user utilizes a selectable option to rent the robot, a connection may be established between the robot and the software on the client device 204, as shown and described in more detail below with respect to FIGS. 2C-2D.

Figure 2C:
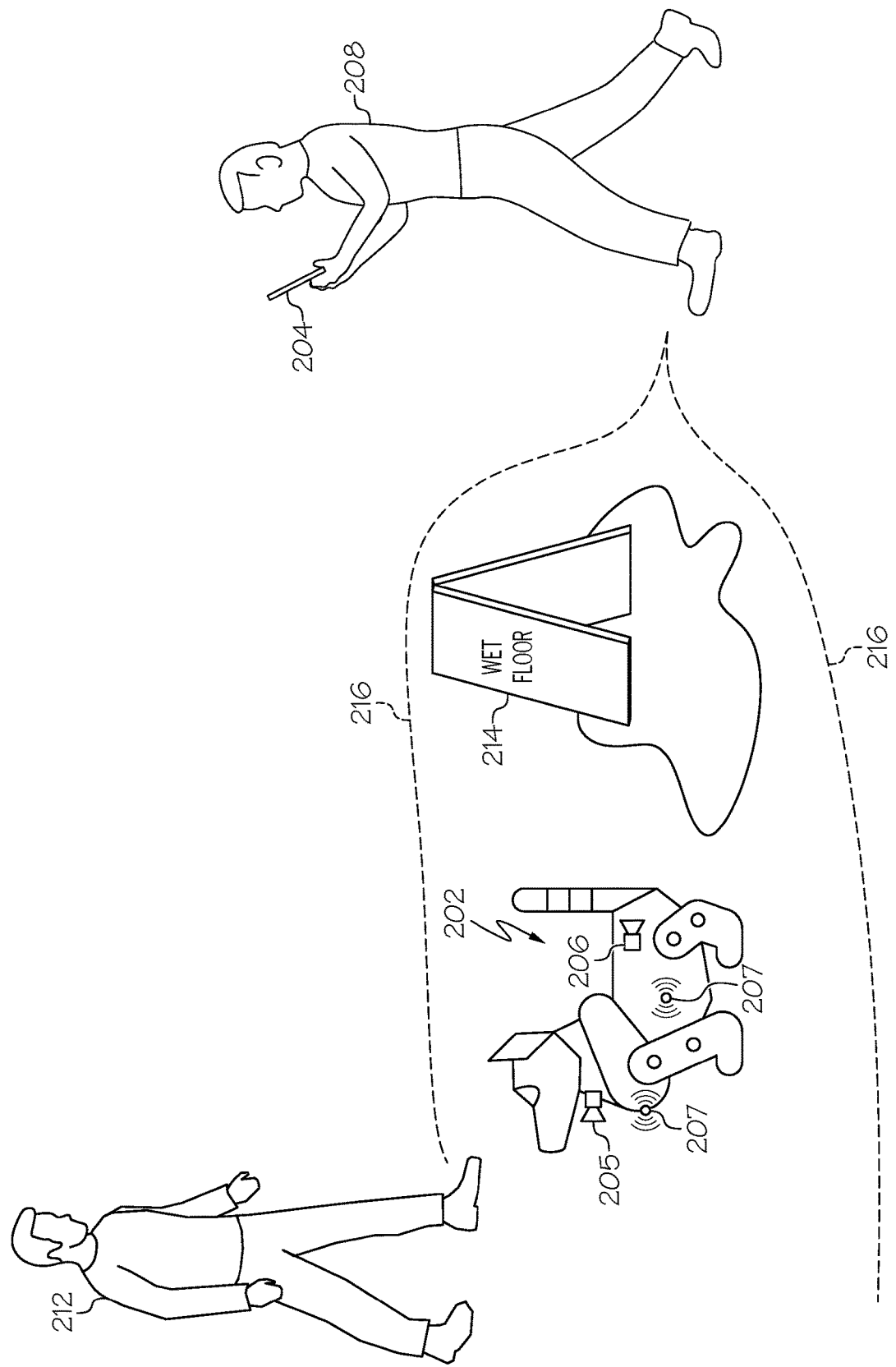
FIG. 2C schematically illustrates the exemplary operating environment of FIG. 2B wherein the user follows the autonomous robot with pedestrians and hazards are present, according to one or more embodiments shown and described herein.

Referring now to FIG. 2C, the exemplary operating environment of FIG. 2A wherein the user follows the autonomous robot where pedestrians and hazards are present is shown according to various embodiments. In this embodiment, robot 202 may utilize its front camera 205 and rear camera 206 to assess the surrounding environment via object recognition (performed by server). Additionally, communication between the sensors 207 on the robot 202 and the mobile client device 204 held by the user 208 may be utilized to determine distance between and/or positioning information of each of the robot 202 and the mobile client device 204. In this way, the robot 202 can assess the distance and location of the mobile client device 204 and thereby the user 208 within the environment. For example, if the user 208 is visually impaired, the user 208 may be utilizing the robot 202 as a guide. In this example, a pedestrian 212 approaches the user 208 at an angle (i.e., decreasing their proximity), and an obstacle 214 (a wet floor in this non-limiting example, also with decreasing proximity with respect to the approaching user 208) is between the robot 202 and the user 208. Given this, the user 208 may have two paths 216 to get around the obstacle 214, but with the pedestrian 212 approaching via the right path, the left path may be a better option. By utilizing image recognition performed on the server, the robot 202 and/or the mobile client device 204 determine that the user 208 should take the left path, by way of non-limiting example. An embodiment of this is further discussed with respect to FIG. 4, in which an alert threshold is utilized with respect to objects identified in the environment utilizing object recognition techniques and an alert threshold.

Figure 2D:
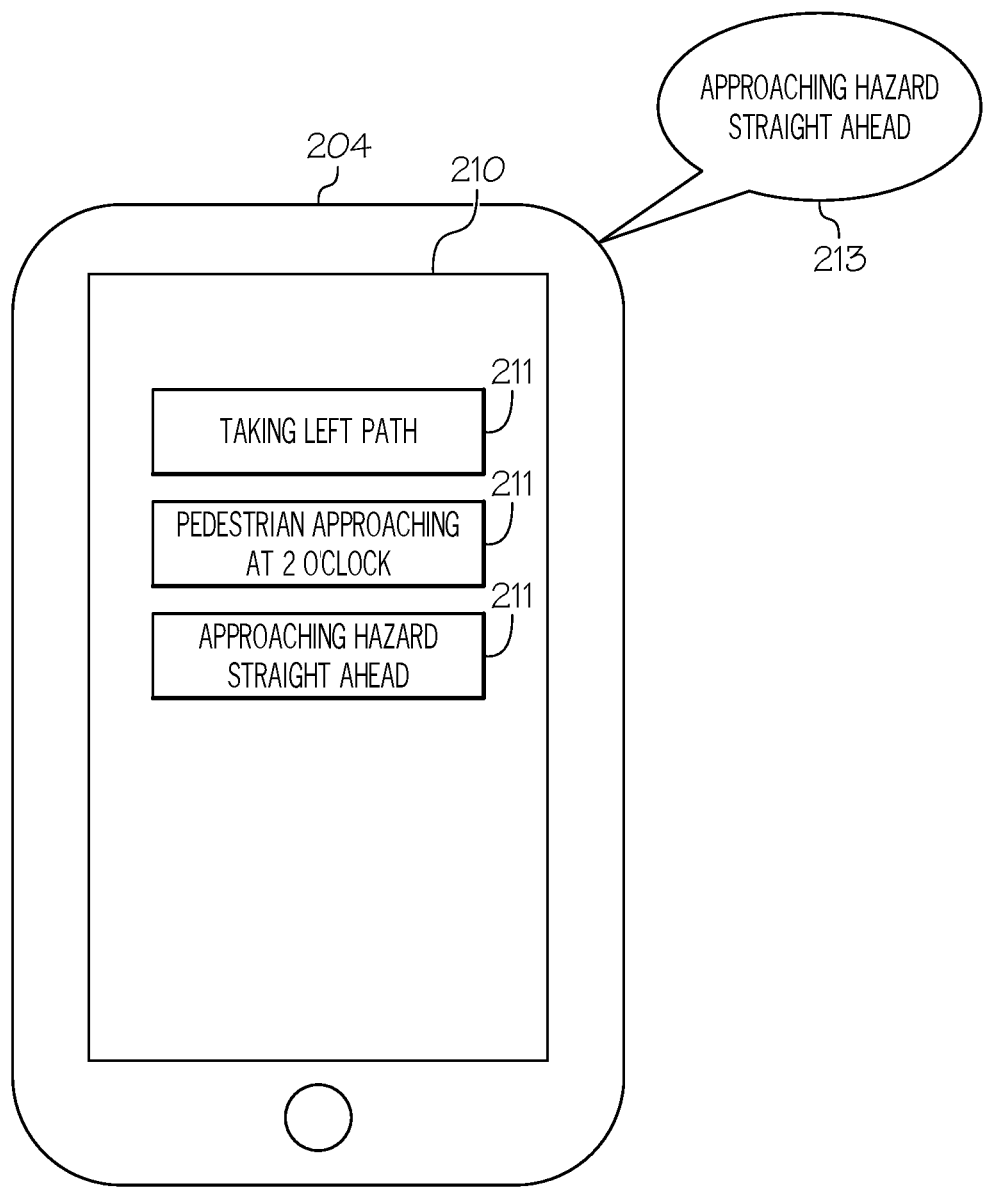
FIG. 2D schematically illustrates the exemplary operating environment of FIG. 2C wherein the user is provided audio and visual status updates via the portable client device, according to one or more embodiments shown and described herein.

Referring now to FIG. 2D, the exemplary operating environment of FIG. 2C, wherein the user may be provided audio and/or visual status updates via the portable client device, is shown according to various embodiments. In some embodiments, the display 210 on the mobile client device 204 may display visual data (such as the camera view) from the robot via software on the client device 204. The display 210 may, in embodiments, provide various selectable options 211 to alert the user and/or provide instructions to the robot. In this embodiment, the selectable options 211 may alert the user as to the conditions discussed above with respect to FIG. 2C. In another embodiment, the user may select one of the selectable options 211 to obtain further information or direct further action (such as by the robot). For example, the selectable option 211 in FIG. 2C regarding an approaching pedestrian may be selected by the user in order to direct the robot's attention to monitor the pedestrian and/or to provide further information to the user such as the current or real-time distance of the pedestrian from the mobile client device 204. Continuing with this example, the robot may track the locations of the pedestrian as well as the mobile client device 204. In some embodiments, audible alerts 213 may be provided from the mobile client device 204 and/or the robot. In some embodiments, choices may be provided on-screen via selectable options 211 or via voice-command(s) to instruct the robot as to where the user wishes to go (such as choosing the left or right path), including updated destination(s) and/or route segments. In other embodiments, the user may not follow the robot such that the robot may recalculate its route based upon the updated location of the user and/or mobile client device 204, wherein the robot may start a recalculated route to lead the user. In some embodiments, the robot may follow or otherwise be around the user without leading.

Figure 3:
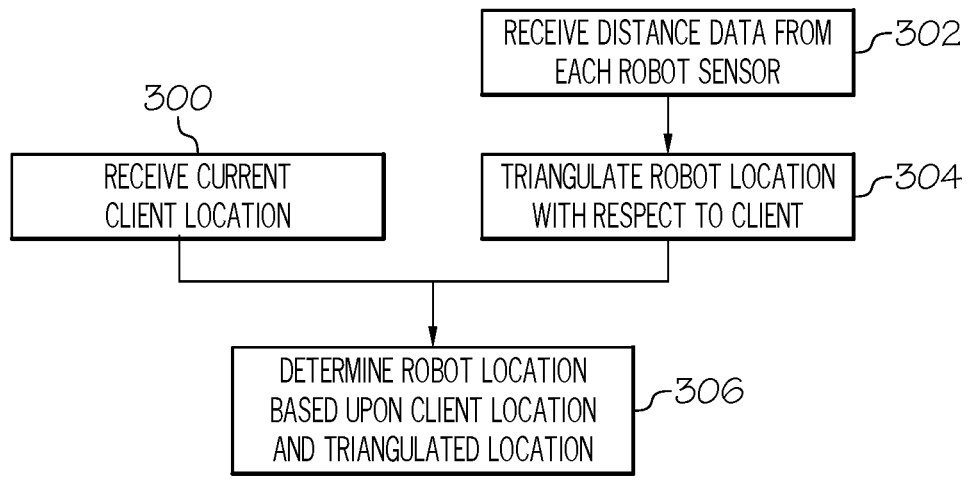
FIG. 3 is a flow diagram depicting exemplary location determination of a robot with respect to a client device, according to one or more embodiments shown and described herein.

Referring now to FIG. 3, a flow diagram depicting exemplary location determination of a robot with respect to a mobile client device is shown according to various embodiments. At block 300, the current mobile client device location may be received. Any suitable location-determining technology (such as GPS, cell tower triangulation, Wi-Fi-based location, and the like) may be utilized. At block 302, distance data may be received from a plurality of sensors located on/in the robot, such as Bluetooth sensors, although any suitable wireless protocol may be utilized. At block 304, once each Bluetooth sensor's relative distance to the mobile client device is ascertained, the robot's location relative to the mobile client device can be determined via triangulation or any other suitable technique. At block 306, the location of the robot may be determined by utilizing the location of the robot relative to the determined location of the mobile client device.

Figure 4:
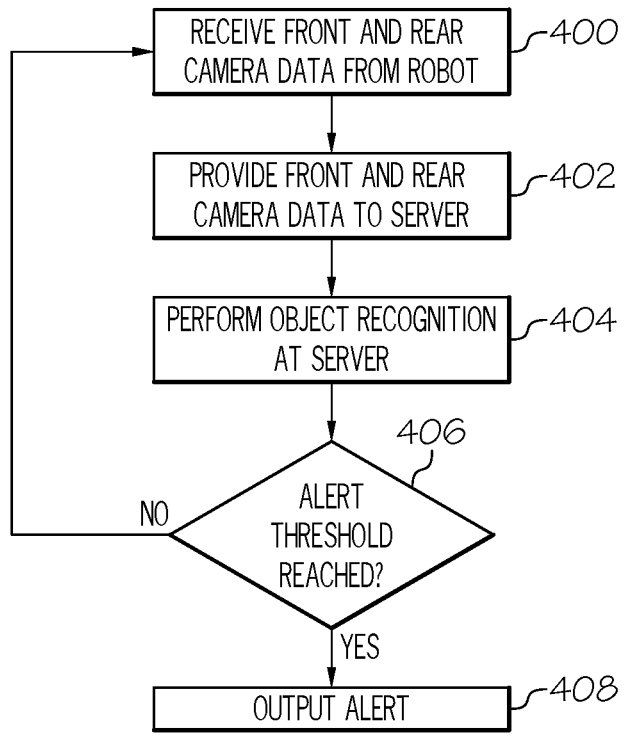
FIG. 4 is a flow diagram depicting exemplary robot alerts based upon object recognition, according to one or more embodiments shown and described herein.

Referring now to FIG. 4, a flow diagram depicting exemplary robot alerts based upon object/person recognition is shown according to various embodiments. At block 400, front and/or rear camera data may be received from the robot at the mobile client device, although any number of cameras in any configuration may be utilized. At block 402, the mobile client device may transmit the front and/or rear camera data to another device, such as a remote server. At block 404, any suitable type of object/person recognition may be performed at the server (or other computing device). At block 406, a determination may be made as to whether an alert threshold has been reached and/or exceeded. Any suitable type of alert threshold may be utilized with respect to the user and/or mobile client device, such as distance, approaching speed, type of hazard (wet floor, hole, cliff, debris, vehicle, and the like) where hazard types may be scored based upon risk, speed with which an object/hazard/person will be encountered, and the like. The alert threshold may take into account the projected path of the user and/or an object/other person, such as whether such a person/object is likely to be in the path of the user, either given its current position or projected position with respect to the user's projected path.

If an alert threshold at block 406 is not reached/exceeded, then the flow diagram may return to block 400 to continue receiving camera data (i.e., live, continuous, real-time or near-real-time, and the like). Otherwise, the flow diagram may proceed to block 408 where an alert may be given. In embodiments, one or more alerts may be generated in any suitable form, such as from the mobile client device (via visually on the screen and/or other lights, an audio notification, a tactile alert such as via any type of vibratory pattern). In other embodiments, one or more alerts may be provided by the robot (such as visually via its movement/gesture(s) and/or lights, auditory, and/or tactile such as via touching the user). In still other embodiments, both the mobile client device and/or the robot may provide alerts.

Figure 5A:
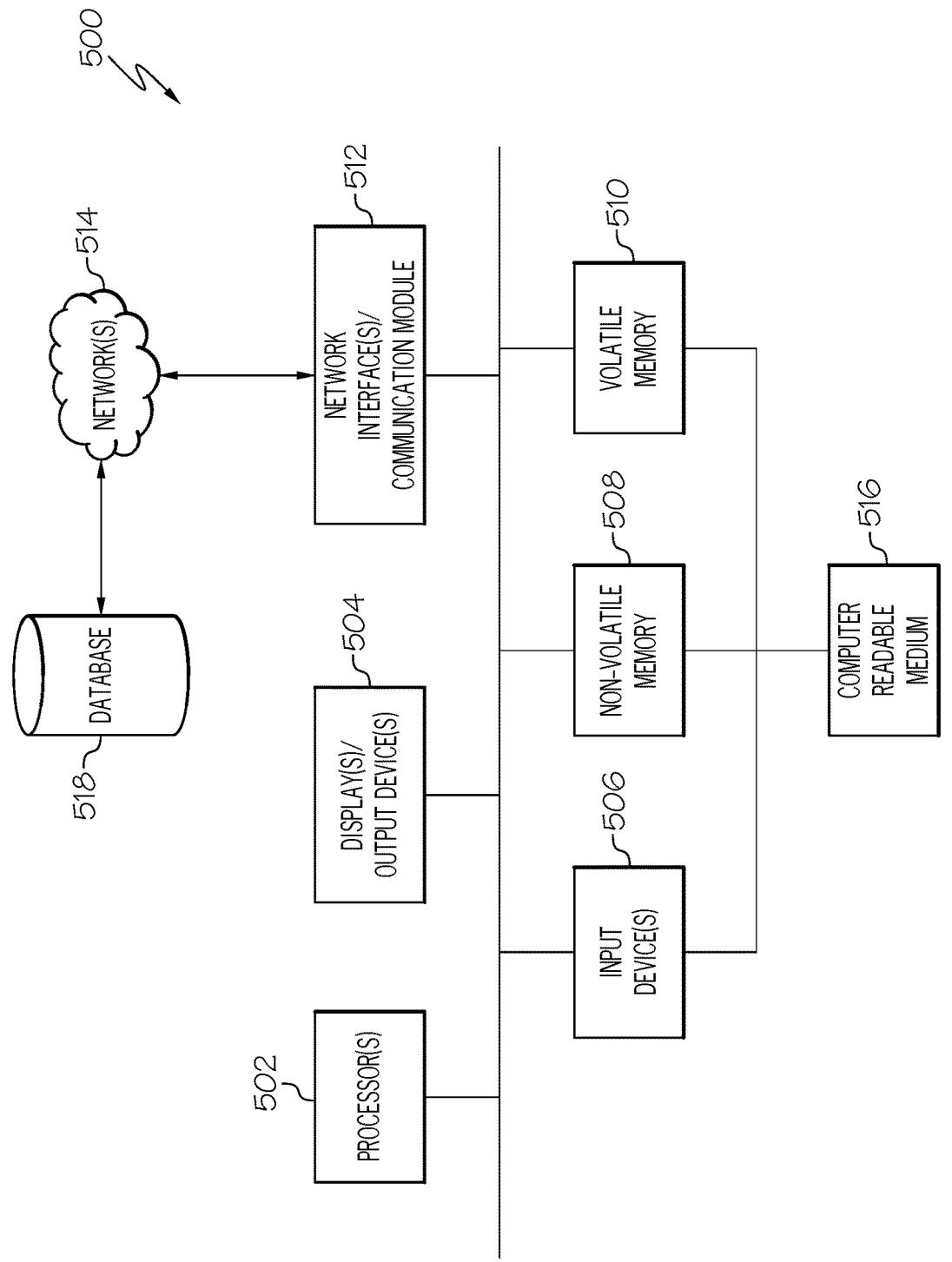
FIG. 5A is a block diagram illustrating computing hardware utilized in one or more clients, robots, and servers, according one or more embodiments shown and described herein.

Turning now to FIG. 5A, a block diagram illustrates an exemplary computing device 500, through which embodiments of the disclosure can be implemented. The computing device 500 described herein is but one example of a suitable computing device and does not suggest any limitation on the scope of any embodiments presented. The computing device 500 in some embodiments may also be utilized to implement a robot 102, a client device 104, a server 106 and/or any combination thereof. Nothing illustrated or described with respect to the computing device 500 should be interpreted as being required or as creating any type of dependency with respect to any element or plurality of elements. In various embodiments, a computing device 500 may include, but need not be limited to, a desktop, laptop, server, client, tablet, smartphone, or any other type of device that can utilize data. In an embodiment, the computing device 500 includes at least one processor 502 and memory (non-volatile memory 508 and/or volatile memory 510). The computing device 500 can include one or more displays and/or output devices 504 such as monitors, speakers, headphones, projectors, wearable-displays, holographic displays, and/or printers, for example. Output devices 504 may further include, for example, a display 210 of the client device 204, a display and/or speakers of a server 106, a display and/or speakers of a robot 202, devices that emit energy (radio, microwave, infrared, visible light, ultraviolet, x-ray and gamma ray), electronic output devices (Wi-Fi, radar, laser, etc.), audio (of any frequency), etc.

The computing device 500 may further include one or more input devices 506 which can include, by way of example, any type of mouse, keyboard, disk/media drive, memory stick/thumb-drive, memory card, pen, touch-input device, biometric scanner, voice/auditory input device, motion-detector, camera, scale, and the like. Input devices 506 may further include sensors, cameras, sensing components of a robot 102, client device 104, and/or server 106 (touch screen, buttons, accelerometer, light sensor, etc.), and any device capable of measuring data such as motion data (accelerometer, GPS, magnetometer, gyroscope, etc.), biometric (blood pressure, pulse, heart rate, perspiration, temperature, voice, facial-recognition, motion/gesture tracking, gaze tracking, iris or other types of eye recognition, hand geometry, fingerprint, DNA, dental records, weight, or any other suitable type of biometric data, etc.), video/still images, and audio (including human-audible and human-inaudible ultrasonic sound waves). Input devices 506 may include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like.

The computing device 500 typically includes non-volatile memory 508 (ROM, flash memory, etc.), volatile memory 510 (RAM, etc.), or a combination thereof. A network interface 512 can facilitate communications over a network 514 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. One or more network interface(s) 512 can be communicatively coupled to any device capable of transmitting and/or receiving data via one or more network(s) 514. Accordingly, the network interface hardware 512 can include a communication transceiver for sending and/or receiving any wired or wireless communication. For example, the network interface hardware 512 may include an antenna, a modem, LAN port, Wi-Fi card, WiMax card, mobile communications hardware, near-field communication hardware, satellite communication hardware and/or any wired or wireless hardware for communicating with other networks and/or devices. The database 518 may reside within the server 106, the client device 104, and/or the robot 102 but in other embodiments one or more databases 518 may be external and accessed via the network(s) 514 to remotely access data and store data.

A computer-readable medium 516 may comprise a plurality of computer readable mediums, each of which may be either a computer readable storage medium or a computer readable signal medium. A computer readable storage medium may reside, for example, within an input device 506, non-volatile memory 508, volatile memory 510, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 500 may include one or more network interfaces 512 to facilitate communication with one or more remote devices, which may include, for example, client device 104, robot 102, and/or server 106 devices. Any suitable network configuration may be utilized. A network interface 512 may also be described as a communications module, as these terms may be used interchangeably.

Figure 5B:
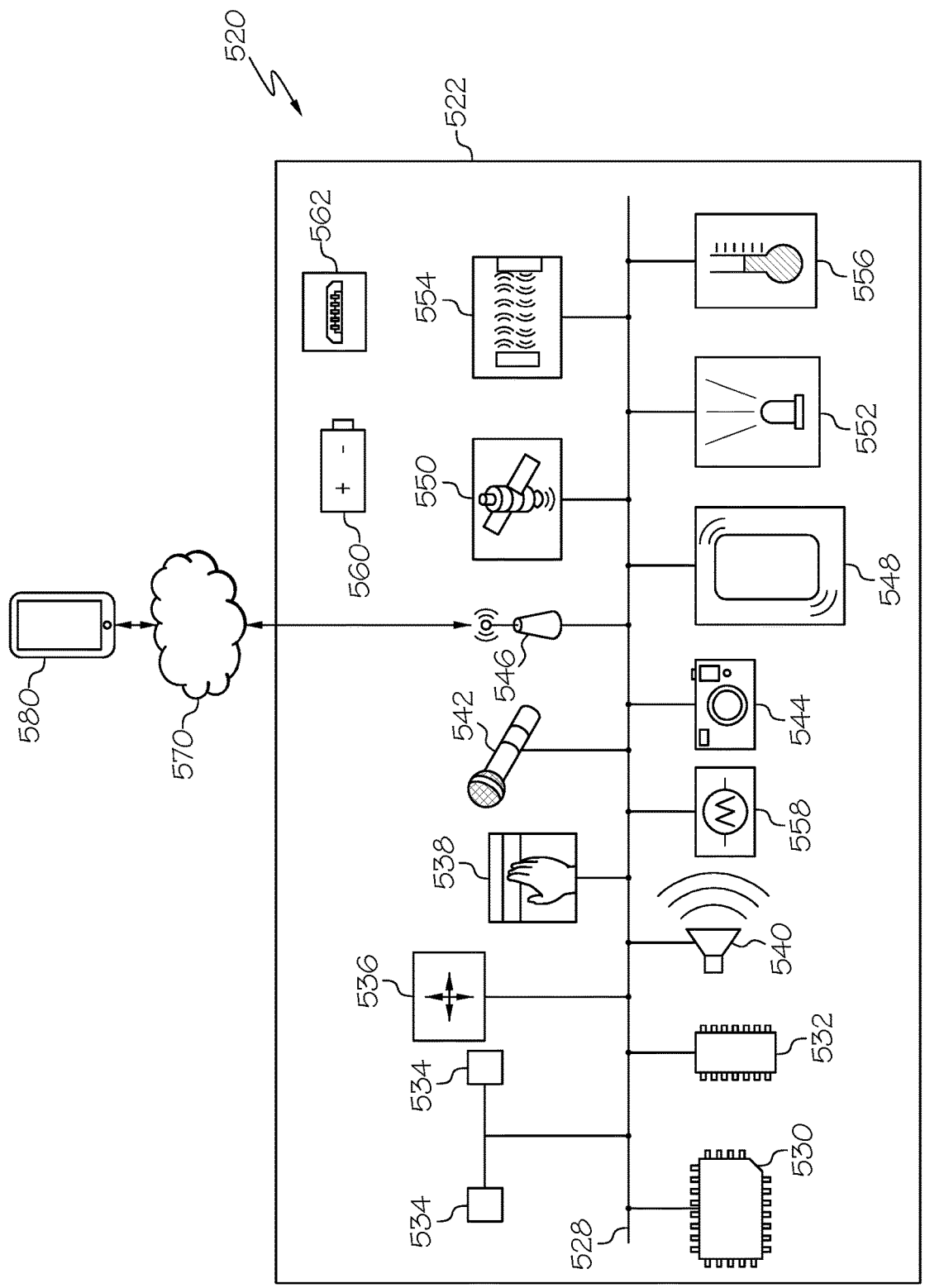
FIG. 5B is a block diagram illustrating hardware utilized in one or more robots for implementing various systems and processes, according one or more embodiments shown and described herein.

Turning to FIG. 5B, example components of one embodiment of a robot 520 is schematically depicted. Any of the component, or combination of components, depicted in FIG. 5B may not be included in various embodiments. In this embodiment, a robot 520 includes a housing 522, a communication path 528, a processor 530, a memory module 532, robot sensors 534, an inertial measurement unit 536, an input device 538, an audio output device (e.g., a speaker 540), a microphone 542, a camera 544, network interface hardware 546, a tactile feedback device 548, a location sensor 550, a light 552, a proximity sensor 554, a temperature sensor 556, a motorized mobility assembly 558, a battery 560, and a charging port 562. The components of the robot 520 other than the housing 522 may be contained within or mounted to the housing 522. The various components of the robot 520 and the interaction thereof will be described in detail herein.

Still referring to FIG. 5B, the communication path 528 may be formed from any medium that may be capable of transmitting a signal such as, for example, conductive wires, conductive traces, optical waveguides, or the like. Moreover, the communication path 528 may be formed from a combination of mediums capable of transmitting signals. In one embodiment, the communication path 528 comprises a combination of conductive traces, conductive wires, connectors, and buses that cooperate to permit the transmission of electrical data signals to components such as processors, memories, sensors, input devices, output devices, and communication devices. Accordingly, the communication path 528 may comprise a bus. Additionally, it is noted that the term "signal" may mean a waveform (e.g., electrical, optical, magnetic, mechanical or electromagnetic), such as DC, AC, sinusoidal-wave, triangular-wave, square-wave, vibration, and the like, capable of traveling through a medium. The communication path 528 communicatively couples the various components of the robot 520. As used herein, the term "communicatively coupled" means that coupled components are capable of exchanging data signals with one another such as, for example, electrical signals via conductive medium, electromagnetic signals via air, optical signals via optical waveguides, and the like.

The processor 530 of the robot 520 may be any device capable of executing machine-readable instructions. Accordingly, the processor 530 may be a controller, an integrated circuit, a microchip, a computer, or any other computing device. The processor 530 may be communicatively coupled to the other components of the robot 520 by the communication path 528. Accordingly, the communication path 528 may communicatively couple any number of processors with one another, and allow the components coupled to the communication path 528 to operate in a distributed computing environment. Specifically, each of the components may operate as a node that may send and/or receive data. Embodiments may include more than one processor.

Still referring to FIG. 5B, the memory module 532 of the robot 520 may be coupled to the communication path 528 and communicatively coupled to the processor 530. The memory module 532 may comprise RAM, ROM, flash memories, hard drives, or any non-transitory memory device capable of storing machine-readable instructions such that the machine-readable instructions can be accessed and executed by the processor 530. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 532. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 5B includes a single memory module 532, other embodiments may include more than one memory module.

Two robot sensors 534 (Bluetooth, RFID, NFC, visual, weight, tactile, radar, lidar, infrared, time of flight, etc.) are depicted on the robot 520, although any suitable number (including none) may be utilized, and include any suitable hardware such as processors, memory, wired/wireless communication and/or power components. The robot sensors 534 may but need not be of the same type and/or model. A robot sensor 534 may be included on any suitable portion of the robot 520, without regard to the placement of other robot sensors 534. The inertial measurement unit 536, if provided, may be coupled to the communication path 528 and communicatively coupled to the processor 530. The inertial measurement unit 536 may include one or more accelerometers and one or more gyroscopes. The inertial measurement unit 536 transforms sensed physical movement of the robot 520 into a signal indicative of an orientation, a rotation, a velocity, or an acceleration of the robot 520. The operation of the robot 520 may depend on an orientation of the robot 520 (e.g., whether the robot 520 is horizontal, tilted, and the like). Some embodiments of the robot 520 may not include the inertial measurement unit 536, such as embodiments that include an accelerometer but not a gyroscope, embodiments that include a gyroscope but not an accelerometer, or embodiments that include neither an accelerometer nor a gyroscope.

Still referring to FIG. 5B, one or more input devices 538 are coupled to the communication path 528 and communicatively coupled to the processor 530. The input device 538 may be any device capable of transforming user contact into a data signal that can be transmitted over the communication path 528 such as, for example, a button, a switch, a knob, a microphone or the like. In some embodiments, the input device 538 includes a power button, a volume button, an activation button, a scroll button, or the like. The one or more input devices 538 may be provided so that the user may interact with the robot 520, such as to navigate menus, make selections, set preferences, and other functionality described herein. In some embodiments, the input device 538 includes a pressure sensor, a touch-sensitive region, a pressure strip, or the like. It should be understood that some embodiments may not include the input device 538. As described in more detail below, embodiments of the robot 520 may include multiple input devices disposed on any surface of the housing 522. In some embodiments, one or more of the input devices 538 are configured as a fingerprint sensor for unlocking the robot. For example, only a user with a registered fingerprint may unlock and use the robot 520.

The speaker 540 (i.e., an audio output device) may be coupled to the communication path 528 and communicatively coupled to the processor 530. The speaker 540 transforms audio message data from the processor 530 of the robot 520 into mechanical vibrations producing sound. For example, the speaker 540 may provide to the user navigational menu information, setting information, status information, information regarding the environment as detected by image data from the one or more cameras 544, and the like. However, it should be understood that, in other embodiments, the robot 520 may not include the speaker 540.

The microphone 542 may be coupled to the communication path 528 and communicatively coupled to the processor 530. The microphone 542 may be any device capable of transforming a mechanical vibration associated with sound into an electrical signal indicative of the sound. The microphone 542 may be used as an input device 538 to perform tasks, such as navigate menus, input settings and parameters, and any other tasks. It should be understood that some embodiments may not include the microphone 542.

Still referring to FIG. 5B, the camera 544 may be coupled to the communication path 528 and communicatively coupled to the processor 530. The camera 544 may be any device having an array of sensing devices (e.g., pixels) capable of detecting radiation in an ultraviolet wavelength band, a visible light wavelength band, or an infrared wavelength band. The camera 544 may have any resolution. The camera 544 may be an omni-directional camera, or a panoramic camera. In some embodiments, one or more optical components, such as a mirror, fish-eye lens, or any other type of lens may be optically coupled to the camera 544. As described in more detail below, the camera 544 is a component of an imaging assembly operable to be raised above the housing 522 to capture image data.

The network interface hardware 546 may be coupled to the communication path 528 and communicatively coupled to the processor 530. The network interface hardware 546 may be any device capable of transmitting and/or receiving data via a network 570. Accordingly, network interface hardware 546 can include a wireless communication module configured as a communication transceiver for sending and/or receiving any wired or wireless communication. For example, the network interface hardware 546 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 546 includes hardware configured to operate in accordance with the Bluetooth wireless communication protocol. In another embodiment, network interface hardware 546 may include a Bluetooth send/receive module for sending and receiving Bluetooth communications to/from a portable electronic device 580. The network interface hardware 546 may also include a radio frequency identification ("RFID") reader configured to interrogate and read RFID tags.

In some embodiments, the robot 520 may be communicatively coupled to a portable electronic device 580 via the network 570. In some embodiments, the network 570 is a personal area network that utilizes Bluetooth technology to communicatively couple the robot 520 and the portable electronic device 580. In other embodiments, the network 570 may include one or more computer networks (e.g., a personal area network, a local area network, or a wide area network), cellular networks, satellite networks and/or a global positioning system and combinations thereof. Accordingly, the robot 520 can be communicatively coupled to the network 570 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 5B, as stated above, the network 570 may be utilized to communicatively couple the robot 520 with the portable electronic device 580. The portable electronic device 580 may include a mobile phone, a smartphone, a personal digital assistant, a camera, a dedicated mobile media player, a mobile personal computer, a laptop computer, and/or any other portable electronic device capable of being communicatively coupled with the robot 520. The portable electronic device 580 may include one or more processors and one or more memories. The one or more processors can execute logic to communicate with the robot 520. The portable electronic device 580 may be configured with wired and/or wireless communication functionality for communicating with the robot 520. In some embodiments, the portable electronic device 580 may perform one or more elements of the functionality described herein, such as in embodiments in which the functionality described herein is distributed between the robot 520 and the portable electronic device 580.

The location sensor 550 may be coupled to the communication path 528 and communicatively coupled to the processor 530. The location sensor 550 may be any device capable of generating an output indicative of a location. In some embodiments, the location sensor 550 includes a global positioning system (GPS) sensor, though embodiments are not limited thereto. Some embodiments may not include the location sensor 550, such as embodiments in which the robot 520 does not determine a location of the robot 520 or embodiments in which the location may be determined in other ways (e.g., based on information received from the camera 544, the microphone 542, the network interface hardware 546, the proximity sensor 554, the inertial measurement unit 536 or the like). The location sensor 550 may also be configured as a wireless signal sensor capable of triangulating a location of the robot 520 and the user by way of wireless signals received from one or more wireless signal antennas.

The motorized mobility assembly 558 may be coupled to the communication path 528 and communicatively coupled to the processor 530, where the wheel assembly in some embodiments corresponds to wheels 318 as discussed below. As described in more detail below, the motorized mobility assembly 558 may include motorized wheels (not shown) that are driven by one or motors (not shown). The processor 530 may provide one or more drive signals to the motorized mobility assembly 558 to actuate the motorized wheels such that the robot 520 travels to a desired location, such as a location that the user wishes to acquire environmental information (e.g., the location of particular objects within at or near the desired location). In some embodiments, such as the robot 202 depicted in FIGS. 2A and 2C, may utilize one or more legs that do not have wheels.

Still referring to FIG. 5B, the light 552 may be coupled to the communication path 528 and communicatively coupled to the processor 530. The light 552 may be any device capable of outputting light, such as, but not limited to, a light emitting diode, an incandescent light, a fluorescent light, or the like. Some embodiments include a power indicator light that is illuminated when the robot 520 is powered on. Some embodiments include an activity indicator light that is illuminated when the robot 520 is active or processing data. Some embodiments include an illumination light for illuminating the environment in which the robot 520 is located. Some embodiments may not include the light 552.

The proximity sensor 554 may be coupled to the communication path 528 and communicatively coupled to the processor 530. The proximity sensor 554 may be any device capable of outputting a proximity signal indicative of a proximity of the robot 520 to another object. In some embodiments, the proximity sensor 554 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 554, such as embodiments in which the proximity of the robot 520 to an object is determine from inputs provided by other sensors (e.g., the camera 544, the speaker 540, etc.) or embodiments that do not determine a proximity of the robot 520 to an object, obstacle, person, etc.

The temperature sensor 556 may be coupled to the communication path 528 and communicatively coupled to the processor 530. The temperature sensor 556 may be any device capable of outputting a temperature signal indicative of a temperature sensed by the temperature sensor 556. In some embodiments, the temperature sensor 556 may include a thermocouple, a resistive temperature device, an infrared sensor, a bimetallic device, a change of state sensor, a thermometer, a silicon diode sensor, or the like. Some embodiments of the robot 520 may not include the temperature sensor 556.

Still referring to FIG. 5B, the robot 520 may be powered by the battery 560, which may be electrically coupled to the various electrical components of the robot 520. The battery 560 may be any device capable of storing electric energy for later use by the robot 520. In some embodiments, the battery 560 is a rechargeable battery, such as a lithium-ion battery or a nickel-cadmium battery. In embodiments in which the battery 560 is a rechargeable battery, the robot 520 may include the charging port 562, which may be used to charge the battery 560. Some embodiments may not include the battery 560, such as embodiments in which the robot 520 is powered the electrical grid, by solar energy, or by energy harvested from the environment. Some embodiments may not include the charging port 562, such as embodiments in which the apparatus utilizes disposable batteries for power.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot comprising:
   network interface hardware;
   a plurality of cameras communicatively coupled to the network interface hardware, the plurality of cameras having non-overlapping views;
   a motorized mobility assembly;
   a processor communicatively coupled to the network interface hardware and the motorized mobility assembly;
   memory coupled to the processor, wherein the processor is configured to:
   send a solicitation request to a mobile client device within a predetermined threshold to provide an approve selectable option to permit a user of the mobile client device to accept the robot as a guide and a deny selectable option to permit the user of the mobile client device to deny the robot as a guide,
   establish a connection between the robot and the mobile client device in response receiving a signal indicating that the user has selected the approve selectable option,
   instruct the robot to send a solicitation request to another mobile client device in response receiving a signal indicating that the user has selected the deny selectable option;
   receive camera output from the plurality of cameras;
   output, via the network interface hardware, the camera output to the mobile client device;
   receive, from the mobile client device, object recognition metadata based upon the camera output;
   output a notification to a user of the mobile client device based upon the object recognition metadata,
   wherein the network interface hardware is configured to receive location data comprising a location of the mobile client device,
   wherein the processor is further configured to determine a location of the robot based upon the location of the mobile client device and the position of the robot relative to the mobile client device.

2. The robot of claim 1, wherein the network interface hardware comprises a plurality of sensors located on the robot, wherein:
   the sensors are each configured to:
   output a wireless signal via a wireless protocol to the mobile client device; and
   receive a wireless signal via the wireless protocol.

3. The robot of claim 2, wherein the wireless protocol is Bluetooth.

4. The robot of claim 1, wherein the processor is further configured to determine the location of the robot based upon the robot being in motion and the mobile client device being in motion.

5. The robot of claim 1, wherein the notification comprises an audible warning.

6. The robot of claim 1 wherein:
   a first camera of the plurality of cameras is configured to output a view of the user following the robot; and
   the network interface hardware is further configured to receive object recognition metadata of an object having an increasing proximity with respect to the user.

7. The robot of claim 6 wherein the first camera is configured to view the object approaching the user.

8. The robot of claim 6 wherein:
   a second camera of the plurality of cameras is configured to view the object approaching the user; and
   the user is only in the view of the first camera and the object is only in the view of the second camera.

9. The robot of claim 1, wherein the robot is further configured to approach potential users to advertise guide services.

10. The robot of claim 1, further comprising a non-transitory computer readable medium residing in the mobile client device embodying computer-executable instructions, that when executed by a processor in the mobile client device, configure the mobile client device to:
    receive the camera output from the network interface hardware; and
    output the object recognition metadata to the network interface hardware.

11. The robot of claim 10, further comprising additional instructions that configure the mobile device to:
    output the camera output to a third device; and
    receive the object recognition metadata from the third device.

12. The robot of claim 10, further comprising additional instructions that configure the mobile device to:
    perform object recognition upon the camera output; and
    obtain object recognition metadata from the camera output.

13. The robot of claim 10, further comprising additional instructions that configure the mobile device to display visual output that corresponds to the notification.

14. The robot of claim 10, further comprising additional instructions that configure the mobile device to:

output a prompt for hire on mobile client device;
receive user input; and
output the user input to the robot.

15. A method comprising:
receiving location data, via network interface hardware, comprising a location of a mobile client device;
determining, via the processor, a location of the robot based upon the location of the mobile client device and the position of the robot relative to the mobile client device;
sending a solicitation request to the mobile client device within a predetermined threshold of the robot to provide an approve selectable option to permit a user of the mobile client device to accept the robot as a guide and a deny selectable option to permit the user of the mobile client device to deny the robot as a guide;
establishing a connection between the robot and the mobile client device in response receiving a signal indicating that the user has selected the approve selectable option;
instructing the robot to send a solicitation request to another mobile client device in response receiving a signal indicating that the user has selected the deny selectable option;
receiving, at the robot, camera output from a plurality of cameras located on the robot, the plurality of cameras having non-overlapping views;
outputting the camera output to a mobile client device;
receiving at the robot, from the mobile client device, object recognition metadata based upon the camera output; and
outputting a notification from the robot to a user of the mobile client device based upon the object recognition metadata.

16. The method of claim 15, wherein the robot comprises a plurality of sensors, further comprising:
outputting a wireless signal from the robot via a wireless protocol to the mobile client device;
receiving, at the robot, a wireless signal via the wireless protocol.

17. The method of claim 15, further comprising outputting a notification from the robot to a user of the mobile client device based upon the object recognition metadata satisfying an alert threshold.

* * * * *